Oct. 19, 1965 C. L. TELLER 3,213,330
FAIL SAFE AUTOMATIC ELECTROMAGNETIC CONTROL CIRCUIT
Filed July 2, 1962 4 Sheets-Sheet 1

INVENTOR
Calvin L. Teller
BY
H. F. Johnston
ATTORNEY

INVENTOR
Calvin L. Teller
BY
H. F. Johnston
ATTORNEY

Oct. 19, 1965  C. L. TELLER  3,213,330
FAIL SAFE AUTOMATIC ELECTROMAGNETIC CONTROL CIRCUIT
Filed July 2, 1962  4 Sheets-Sheet 3

INVENTOR
Calvin L. Teller
BY
H. F. Johnston
ATTORNEY

Oct. 19, 1965  C. L. TELLER  3,213,330
FAIL SAFE AUTOMATIC ELECTROMAGNETIC CONTROL CIRCUIT
Filed July 2, 1962  4 Sheets-Sheet 4

INVENTOR
Calvin L. Teller
BY
H. F. Johnston
ATTORNEY

3,213,330
FAIL SAFE AUTOMATIC ELECTROMAGNETIC CONTROL CIRCUIT
Calvin L. Teller, 18 Bilby Drive, Wolcott, Conn..
Filed July 2, 1962, Ser. No. 206,832
3 Claims. (Cl. 317—135)

My invention relates to automatic circuit control means requiring the sequential operation of a pair of switch units for maintenance of the controlled circuit.

The invention may have a wide variety of applications and is particularly useful as a safety measure in various types of machines, including reciprocating presses. Many types of so-called "fail-safe" arrangements have been proposed for such machines, but so far as I am aware, none of them have been altogether reliable in spite of the fact that some of them have been quite expensive.

The general object of my invention is, therefore, to provide control means for such devices which will be thoroughly reliable in operation and at the same time, economical to produce and install.

As constrasted with most prior devices in this field, the system of my invention does not rely on feed-back information collected and made effective after damage may have been done to the machine. Neither does it rely on any complicated or unreliable electronic elements, but involves only commonly known electrical units.

Although the invention is applicable generally to any arrangement where continued operation is made dependent on a pair of sequentially operating switch units, it is shown applied to a reciprocating press where one switch unit is operated by the machine near the beginning of its down-stroke, while the other is operated by a sensor dependent upon a completed part being ejected from the machine.

Other objects and advantages of the invention will hereinafter more fully appear.

In the accompanying drawings, I have shown for purpose of illustration, one embodiment which the invention may assume in practice. In these drawings.

Figure 1:
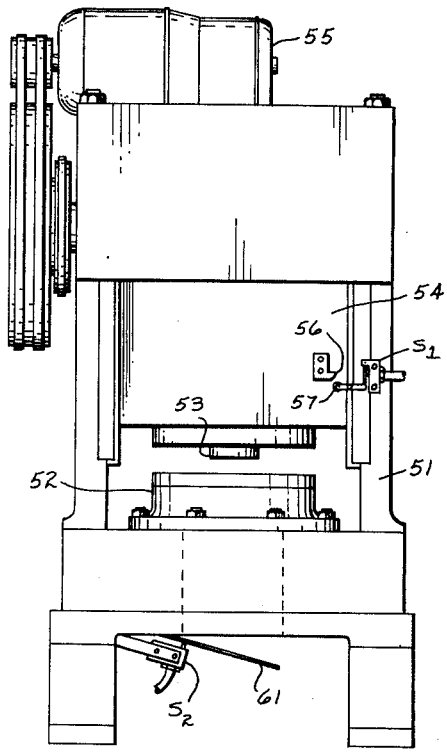
FIG. 1 is a diagrammatic view of a typical machine in which the invention may be utilized.

Before explaining the application to a typical installation, the control system will first be described by reference to the wiring diagrams. Relays of the kind employed in the control system contain what are generally called normally open contacts or normally closed contacts. For convenience of description, these "contacts" will be referred to in the specification and claims as switches. For clarity of illustration, the relays are shown as circles with capital letters and the switches in, and controlled by each relay, are labelled with the corresponding small letter.

The controlled circuit is here indicated by the lines 8 and 9 which may connect a source of power with a motor or clutch for operating a machine. This circuit is under the control of the main solenoid-operated switch or cut-out switch 10. Reduced voltage direct current may be supplied to the control system from a suitable transformer 11 and rectifier 12 to the lines $L_1$ and $L_2$.

The main control relay M is initially energized by manual reset switch 13 which is held closed long enough for the machine to operate at least one of the switch units; for example, $S_1$. When the main relay M is energized, it closes the lock-in contact 14, which is part of a circuit for holding the main relay M energized to keep the main switch 10 closed during normal operation of the machine after the reset switch 13 is released.

In series with the lock-in switch 14, there are two parallel branches in the main energizing circuit indicated by the numerals 15 and 16 which are controlled by switches $S_x$ and $S_y$, respectively, and it will be noted that one or the other of these branches must be closed in order to maintain current to relay M. Switches $S_x$ and $S_y$ are controlled by relays X and Y, respectively, which act to close their respective switches when energized, and when either switch is closed, the circuit to relay M is completed through line 17.

Relays X and Y are sequentially energized through energizing circuits including the two-position switches $S_1$ for relay X, and $S_2$ for relay Y. Switch units $S_1$ and $S_2$ are operated in sequence, one after the other. Each operation of $S_1$ includes movement from the back position closing on contact 18 to a front position closing on contact 19 and returning to the back postion. Each operation of $S_2$ likewise involves movement from the back position on contact 20 to front position on contact 21 and returning to the back position.

Assuming that the reset switch 13 is held closed until the operation of switch unit $S_1$, the touching of contact 19 on the front movement of the switch establishes a circuit to relay $X_1$ through lines 22, 23 and 24.

Figure 4:
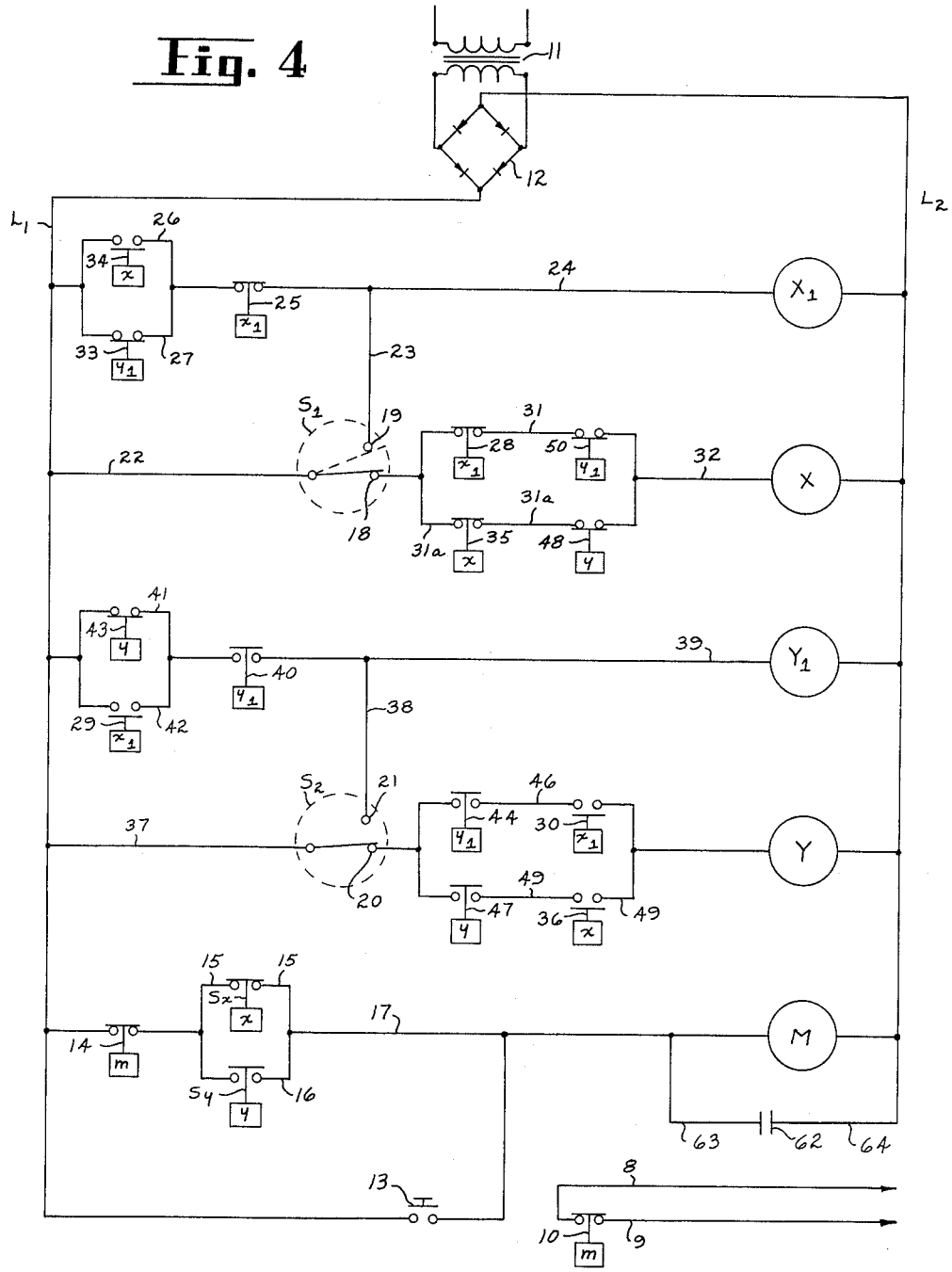
FIG. 4 is a similar wiring diagram showing the position of the parts just after operation of the first switch unit during normal operation of the machine.

When relay $X_1$ is momentarily energized through contact 19, it will close switch 25 to maintain a holding circuit to $X_1$ through either of the parallel lines 26 and 27 as seen in FIG. 4. Another switch 28 on relay $X_1$ will close and other switches 29 and 30 will open. Closing of switch 28 preliminarily sets up the energizing circuit to relay X from line 22, the upper parallel branch 31 and line 32, so that when switch unit $S_1$ returns to the back position on contact 18, relay X will be immediately energized. This closes switch $S_x$ and thus establishes the main energizing circuit for relay M through switch 14, the upper parallel branch 15 and line 17. When relay X is energized, switch 34 will open the upper branch 26 of the circuit to relay $X_1$, switch 35 will close and switch 36 will open.

Figure 5:
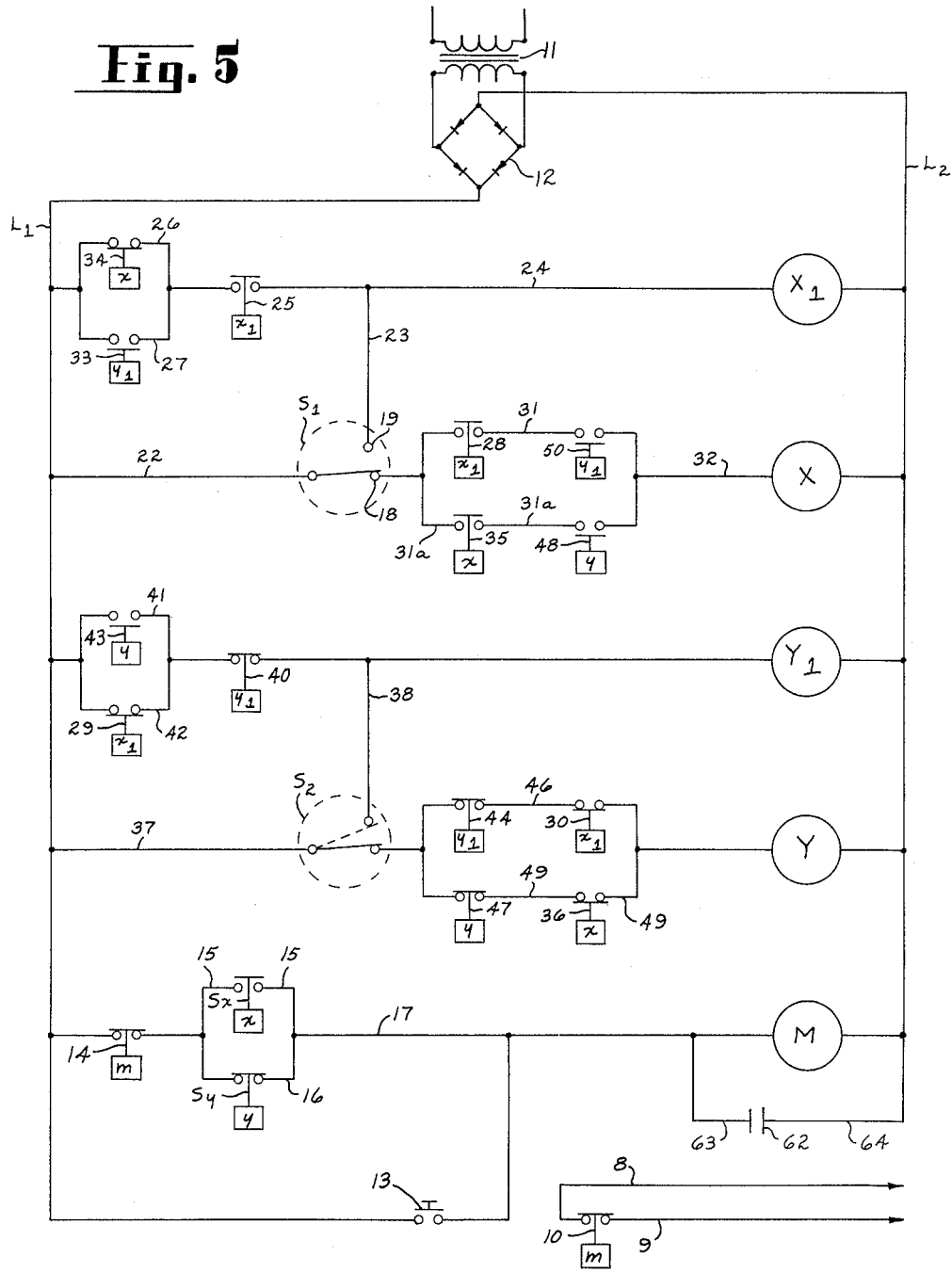
FIG. 5 is a similar wiring diagram showing the position just after complete operation of the second switch unit; and, FIG. 6 is an outline of a typical relay which may be utilized in my control system.

Referring now to FIG. 5, assume that switch unit $S_2$ is next operated to contact 21, a circuit is established to relay $Y_1$ through lines 37, 38 and 39. This closes holding switch 40 to maintain a holding circuit to $Y_1$ through one of the parallel branches 41 and 42 which are controlled by switches 43 and 29, respectively. This preliminarily sets up an energizing circuit to relay Y by closing switch 44. It being understood that when relay $Y_1$ is momentarily energized, relay $X_1$ will drop out because switch 33 controlled by relay $Y_1$ will open (switch 34 having already been opened by energization of relay X) and the dropping out of relay $X_1$ in turn closes switch 30. When relay $Y_1$ is energized, switch 50 will open to break the branch 31 of the circuit to relay X. Then when switch unit $S_2$ returns to the back position on contact 20, relay Y is energized through line 37 and upper parallel branch 46. As soon as relay Y is energized, switch 47 is closed, switch 48 opens to break the branch 31a and drop out relay X, thus establishing the lower parallel branch 49 by closing of switch 36 which is accomplished by de-energization of relay X. Branch 49 thus will keep relay Y energized even after $X_1$ is energized until energization of relay X, so as to maintain current to relay M. At the same time, switch 43 in one of the parallel circuits 41 to relay $Y_1$ is opened on energization of relay Y. There may be a slight time delay on the opening of switch 48 after relay Y is energized in order to allow relay Y to establish the lower branch 16 of the main energizing circuit through switch $S_y$.

It will be noted in FIG. 5, after complete operation of switch unit $S_2$, that all four switches (28 and 50 in the upper parallel branch 31 and switches 35 and 48 in the lower parallel branch 31a) are open and ready for the same sequence of operation as has already been described when switch unit $S_1$ is moved to front and back positions.

It has been explained how relay X drops out after operation of switch unit $S_2$ and energization of relay Y. Similarly, after each operation of switch unit $S_1$ and energization of relays $X_1$ and X, switches 30 and 36 will open to cause relay Y to drop out. This is the condition shown in the diagram of FIG. 4.

It will now be observed that failure to operate switch units $S_1$ and $S_2$ in proper sequence will shut off power to the controlled circuit; for example, should $S_1$ operate a second time before operation of $S_2$, the movement away from contact 18 breaks the circuit to relay X, thereby opening the upper branch 15 of the main energizing circuit while the lower branch 16 is still open. This breaks the circuit to relay M, resulting in cutting out of the main switch 10 and shutting off power to the controlled circuit. At the same time, the lock-in switch 14 opens and prevents re-establishment of the circuit to relay M until the trouble can be corrected, at which time, the operation can be initiated only by the manual reset switch 13.

Figure 6:
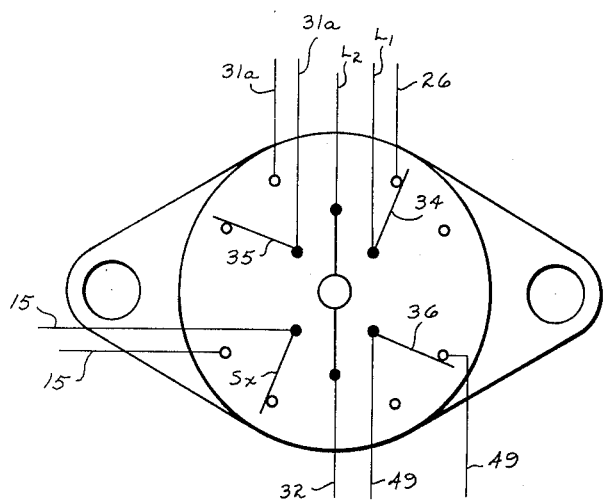
Figure 3:
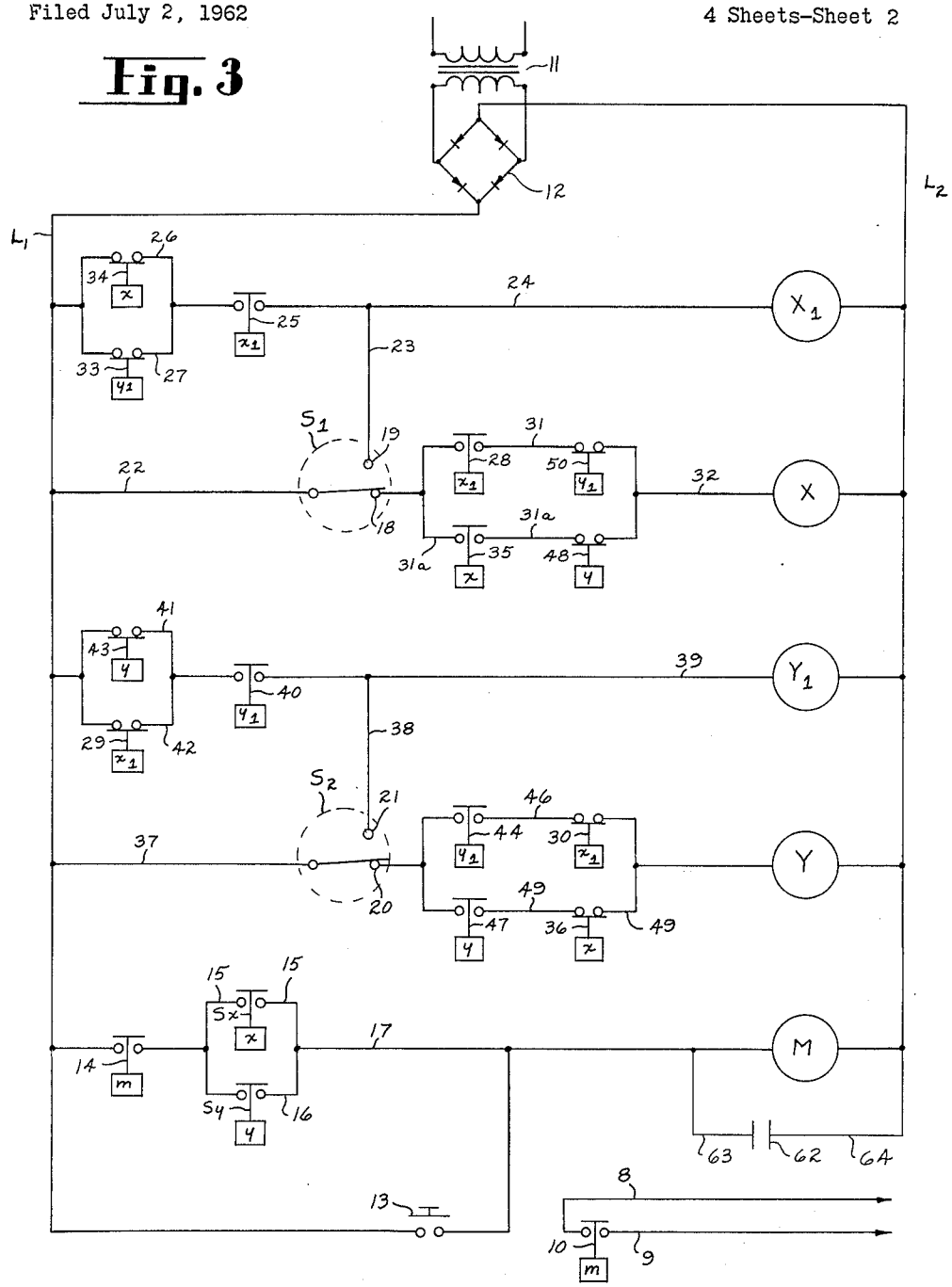
FIG. 3 is a wiring diagram showing the control system at the dead position, showing the positions of the various switches or contacts with all relays de-energized.

In FIG. 6, there is illustrated schematically one of the relays. As shown, it represents relay X in the de-energized position with switches 35 and $S_x$ open and switches 34 and 36 closed. Of course, when this relay is energized, the positions of all four switches will reverse.

Figure 2:
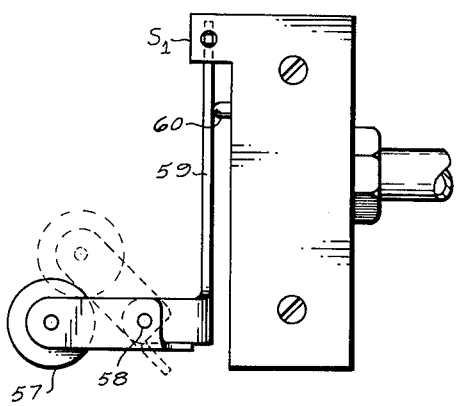
FIG. 2 is a detailed view showing one example of a typical switch unit.

In FIGS. 1 and 2, there is diagrammatically shown one typical application of the invention. A reciprocating punch press 51 has a die 52 and a punch 53 mounted in a head 54 which is reciprocated by suitable mechanism driven by the motor 55. The power to the motor is supplied by the controlled circuit connected to the lines 8 and 9. Switch unit $S_1$ is mounted on the frame alongside the head 54 and is operated by a cam 56 fixed to the head. In the path of the cam 56 is a roller 57 hinged at 58 to a spring arm 59 engaging a plunger 60 operating the switch unit. As the head 54 rises, it will lift the roller 57 out of its path as indicated in dotted line in FIG. 2, and when the head descends, cam 56 engages roller 57 and pushes the plunger 60 inwardly to move the switch unit $S_1$ to what has been called the front position, and as soon as cam 56 passes roller 57, the switch unit will spring back to its back position.

The switch unit $S_2$ is shown mounted under the die 52 and may be actuated by a hinged plate 61 mounted in the path of an article being ejected from the die 52, and of course, the plate 61 is spring-returned. With this arrangement, switch $S_1$ will, of course, be operated each time the head 54 begins its down-stroke, and switch $S_2$ will be operated each time an article is ejected from the die 52.

Now, if it is assumed that something goes wrong and either there is no material in the die to be punched, or the punched article sticks in the die, the switch $S_2$ will not operate so that when the press head returns and operates switch $S_1$, it will immediately break the control circuit and shut off power to the motor 55 or a clutch to stop the machine.

If desired, in order to prevent accidentally dropping out of the main relay M as by vibration of the machine, to which the control system is attached, a capacitor 62 may be connected across the relay M by wires 63 and 64.

It will be observed that I have provided a relatively inexpensive circuit control system which can truly be called "fail-safe." Not only will the circuit be broken if the switch units are operated out of sequence, but sticking of any switch, burning off of contacts or damage to any part of the apparatus, will cause the controlled circuit to be broken.

It will be apparent to those skilled in the art that a plurality of my improved control system may be used in tandem to protect as many operations as desired.

Such terms as "front" and "back," as well as the designation of particular relays and switches by symbols, are used in the specification and claims for the sake of convenience and are not intended to be construed in a literal or limiting sense.

What I claim is:
1. In combination
   (a) a first two-position switch unit S1;
   (b) a second two-position switch unit S2;
   (c) means for repeatedly operating said switch units in sequence; each such operation of either switch unit including movement from the back position to front position and returning to the back position;
   (d) a controlled circuit including a cut-out switch;
   (e) a solenoid for holding said cut-out switch closed when energized, and open when de-energized;
   (f) a main energizing circuit for supplying current to said solenoid, including a lock-in switch held closed by said solenoid and switches $S_x$ and $S_y$ connected in parallel so that at least one of the switches $S_x$ and $S_y$ must be closed to maintain current to said solenoid;
   (g) a relay X controlling switch $S_x$ so as to hold switch $S_x$ closed when energized and open when de-energized;
   (h) a relay Y similarly controlling switch $S_y$;
   (i) a supplemental relay $X_1$ energized temporarily upon movement of said first switch unit to front position;
   (j) a holding circuit for relay $X_1$ having a lock-in switch 25 therein, closed by energization of relay $X_1$;
   (k) a supplemental relay $Y_1$ energized temporarily upon movement of said second switch unit to front position;
   (l) a holding circuit for relay $Y_1$ having a lock-in switch 40 therein closed by relay $Y_1$;
   (m) said first and second two-position switch units in back position closing contacts in the energizing circuits for relays X and Y, respectively; and
   (n) means operated by said relays X, $X_1$, Y and $Y_1$ for controlling the holding circuits to said supplementally relays and the energizing circuits to relays X and Y in such a way as to maintain the circuit to said cut-out switch solenoid only as long as the operations of said switch units are normal and sequential.
2. The combination defined in claim 1 wherein said means specified in clause (n) comprises
   (n1) in said holding circuit for relay $X_1$, normally closed contacts of relays X and Y, connected in parallel;
   (n2) in said energizing circuit for relay X, two parallel branches, one such branch having a normally open contact of relay $X_1$ and a normally closed contact of relay $Y_1$ connected in series, while the other such branch has a normally open contact of relay X and a normally closed contact of relay Y connected in series;
   (n3) in said holding circuit for relay $Y_1$, normally closed contacts of relays $X_1$ and Y connected in parallel;
   (n4) in said energizing circuit for relay Y, two parallel branches, one of which has a normally open contact of relay $Y_1$ and a normally closed contact of relay

$X_1$ connected in series, while the other of which has a normally open contact of relay Y and a normally closed contact of relay X connected in series;

(n5) wherein the term "normally" applies to the positions of the contacts with all of said relays de-energized.

3. The combination defined in the immediately preceding claim, together with a capacitor connected across the aforesaid solenoid which holds the cut-out switch closed to delay dropout when said solenoid is de-energized.

References Cited by the Examiner

UNITED STATES PATENTS

| | | | |
|---|---|---|---|
| 2,790,280 | 4/57 | Wilson et al. | 318—466 X |
| 3,015,977 | 1/62 | Stegnik et al. | 317—157 |
| 3,089,985 | 5/63 | Camfield et al. | 317—135 |

SAMUEL BERNSTEIN, *Primary Examiner.*